United States Patent [19]

Nakamura et al.

[11] Patent Number: 5,626,324

[45] Date of Patent: May 6, 1997

[54] NON-SLIDING VACUUM GATE VALVE

[75] Inventors: Yoshinobu Nakamura; Yuzo Hayashi, both of Tokyo, Japan

[73] Assignee: Irie Koken Co., Ltd., Tokyo, Japan

[21] Appl. No.: 306,452

[22] Filed: Sep. 15, 1994

[30] Foreign Application Priority Data

Jul. 28, 1994 [JP] Japan ................................. 176899

[51] Int. Cl.⁶ .................................................. F16K 3/18
[52] U.S. Cl. ......................... 251/58; 251/158; 251/204; 251/335.3
[58] Field of Search .......................... 251/58, 158, 203, 251/204, 335.3

[56] References Cited

U.S. PATENT DOCUMENTS

| | | |
|---|---|---|
| 4,718,637 | 1/1988 | Contin ................................. 251/203 |
| 4,721,282 | 1/1988 | Shawver . | |
| 5,002,255 | 3/1991 | Sawa et al. ......................... 251/193 |
| 5,116,023 | 5/1992 | Contin ................................. 251/203 |
| 5,120,019 | 6/1992 | Davis . | |
| 5,415,376 | 5/1995 | Ito ................................. 251/204 X |

*Primary Examiner*—Gerald A. Michalsky
*Attorney, Agent, or Firm*—Brooks Haidt Haffner & Delahunty

[57] ABSTRACT

A non-sliding vacuum gate valve has a valve housing with a valve opening therethrough which is opened and closed by a gate valve body moved by a valve rod. The valve rod moves with linear and tilting movement so that the valve body tilts against the valve seat surrounding the valve opening. The valve rod is moved linearly by cylinder rods extending from a pair of cylinders attached to the valve housing on either side of the valve rod. A cam body having an angular cam slot is attached to a connecting member which spans between the end portions of the cylinder rods above the valve rod. The valve rod has a cam follower engaging the angular cam slot to provide the tilting movement of the valve rod and valve body responsive to the alternate reciprocal vertical movement of the cylinder rods, to open and close the valve opening.

11 Claims, 5 Drawing Sheets

NON-SLIDING VACUUM GATE VALVE

BACKGROUND OF THE INVENTION

1. Field of the Invention

The present invention relates to a non-sliding vacuum gate valve, and, more particularly, to a novelly improved non-sliding vacuum gate valve which allows the occurrence of particles to be minimized.

2. Description of the Related Art

An example of a construction of a conventional non-sliding vacuum gate valve is disclosed by the present applicant in U.S. Pat. No. 5,002,255.

In the construction of this valve example, a valve rod is moved downward and a valve body is positioned on valve seats at the openings of a valve housing. Then this valve rod is tilted to push the valve body against the valve seats, thereby closing the opening of the valve box.

Conventional non-sliding vacuum gate valves, which have the above-described construction, have the following problems.

The valve is closed when the valve rod is longest. This results in larger valves because a large-diameter valve rod is used to maintain the strength thereof.

In addition, since the valve rod and the valve body are connected by springs in a freely operable manner, it is impossible to prevent particles from being produced during operation. This makes them unsuitable for use in a chamber of a semiconductor producing device, employed in a clean room which must be kept very clean.

Further, when the valve rod is tilted by air cylinders and arm members, it is impossible to prevent particles from being produced from the portion where pushing members and the arm members contact one another.

Still further, since it is extremely difficult to open the valve box in a sealed state after assembly, it is troublesome, for example, to exchange the O-rings of the valve body.

In the conventional construction, opening and closing operation speed are reduced because linear movement and tilting are performed in connection with each other.

SUMMARY OF THE INVENTION

In view of the above-described problems, the present invention aims at providing a non-sliding vacuum gate valve which particularly allows the occurrence of particles to be minimized.

According to the present invention, there is provided a non-sliding vacuum gate valve performing opening and closing operations on an opening on a valve box by a valve body which is connected to a valve rod, based on the movement and tilting of this rod, by means of a seal bellows, the seal bellows having one end provided on the valve box, the valve so constructed as comprising: a swing body or connecting member provided on and extending between each rod end of a plurality of cylinders, the cylinders being provided on the valve box; a cam body which has a cam hole and is provided on the connecting member; a cam follower which engages in the cam hole and is provided at the end portion of the valve rod; and a slide body which is provided at the other end of the seal bellows and connected to the cam body by means of springs; wherein linear movement of the cam body causes linear and tilting movements of the valve rod and valve body.

In addition, in more detail, a pair of guide bodies, each having a guide hole or slot, are each provided on the respective inner sides of the cylinders, and a guide roller, provided on the slide body, is engaged in the guide hole.

Further, in more detail, the cam hole has a linear guide section for linearly guiding the cam follower, and a lock section for locking the cam follower.

In the non-sliding gate valve of the present invention, each of the cylinders are operated to cause the valve rod and the valve body to move linearly upwards or downwards by means of each rod, slide body, and cam body, thereby allowing the valve to either open or close the opening of the valve box.

With the valve box being in an open or closed state, when the cylinders are further operated to cause the cam body to move linearly, the cam follower at the end portion of the valve rod moves along the linear guide section of the cam hole of the cam body, so that the valve body tilts. At the same time, the valve body tilts and contacts closely with the valve seat at the opening of the valve housing, and closes it. When the cam body, which is operated by the cylinders, is moved linearly, the cam follower engages with the lock section, which is a bent portion of the cam hole. The valve rod may remain tilted in a locked state, so that the valve opening remains closed, even after the driving state of the cylinder is released.

Further, the opening is opened by operating each of the cylinders in reverse mode and linearly moving the connecting member, cam body and the slide body in the opposite direction.

DESCRIPTION OF THE PREFERRED EMBODIMENT

A detailed description will hereunder be given regarding a preferred embodiment of a non-sliding vacuum gate valve of the present invention with reference to the drawings.

Figure 1:
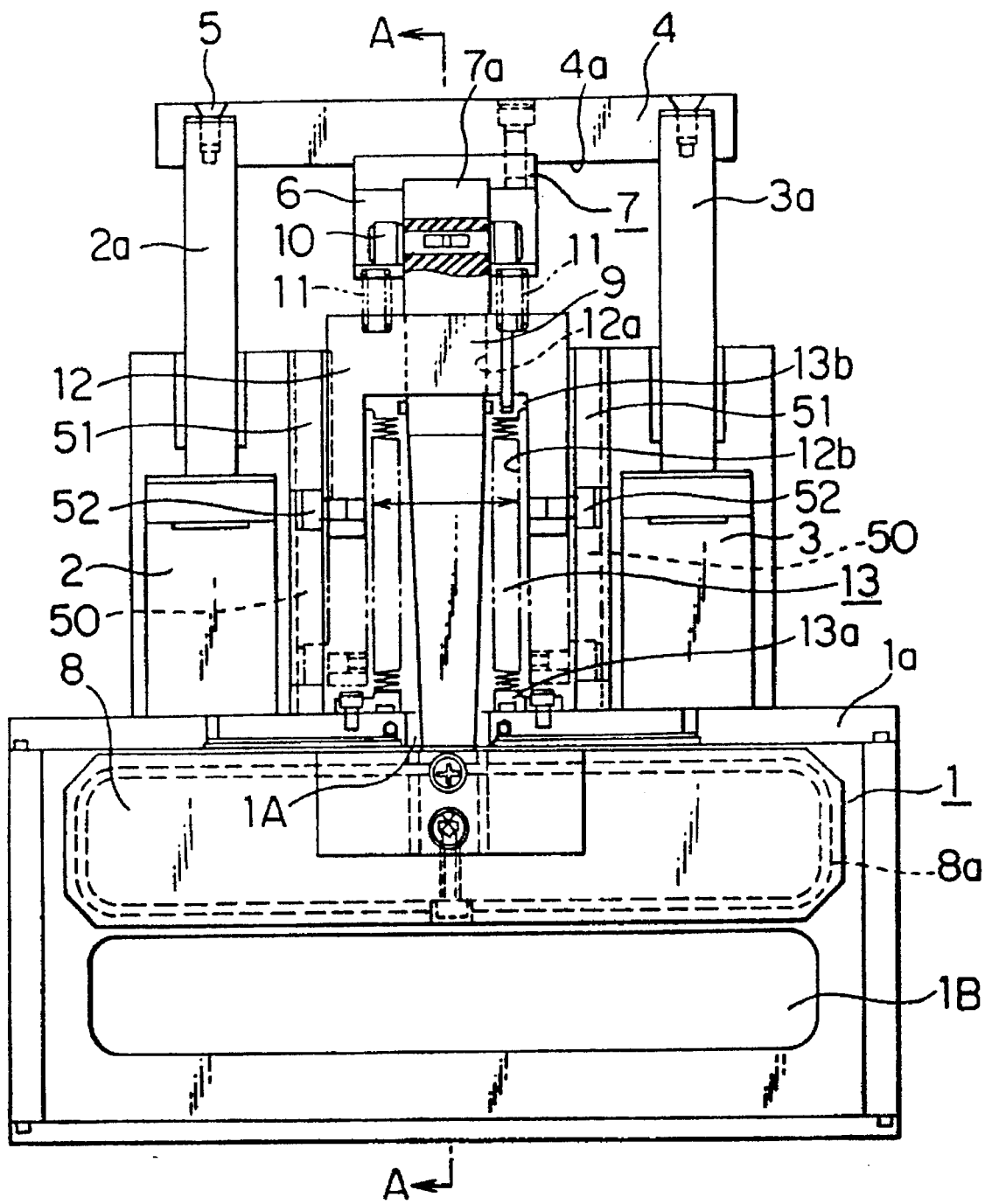
FIG. 1 is a front view of a construction of a non-sliding vacuum gate valve of the present invention.

Referring to FIG. 1, reference numeral 1 denotes a valve box or housing having a well-known valve opening 1B. The valve box 1 is disposed between the chambers of a semiconductor producing apparatus (not shown), used in a clean room.

A plurality of air-type cylinders 2 and 3 are mounted on a bonnet flange 1a of the aforementioned valve box 1. A tubular swing body or connecting member 4 extends between and is fixed to an end portion of each of rods 2a and 3a of each of the cylinders 2 and 3, with a screw 5, respectively.

A cam body 7 having a cam hole 6, which is obliquely formed with respect to the axial lines of the cylinders 2 and 3, is mounted on an underside a surface 4a of the connecting member 4. A roller-type cam follower 10 is mounted on the upper end of a valve rod 9 and moves within the opening 7a provided by the inverted C-shape cam body 7. The valve rod 9 is connected to a valve body 8 in the valve housing 1.

An inverted C-shape slide body 12, is connected to the cam body 7 by means of a plurality of supporting members 11 such as springs or flexible members. The valve rod 9 passes through a through hole 12a of the slide body 12. The slide body 12 and the valve rod 9 are integrally connected tightly together. A flexible vacuum seal bellows 13 has one end 13a fixed onto the bonnet flange 1a of the valve box 1 and the other end 13b connected to the slide body 12 at its upper end within the opening 12b provided by the inverted C-shape of the slide body 12. Therefore, a through hole 1A of the valve body 1 is kept in a sealed state by the valve rod 9, the seal bellows 13 and the slide body 12, so that the valve box 1 is kept air-tight during the operation of the valve rod 9.

Figure 2:
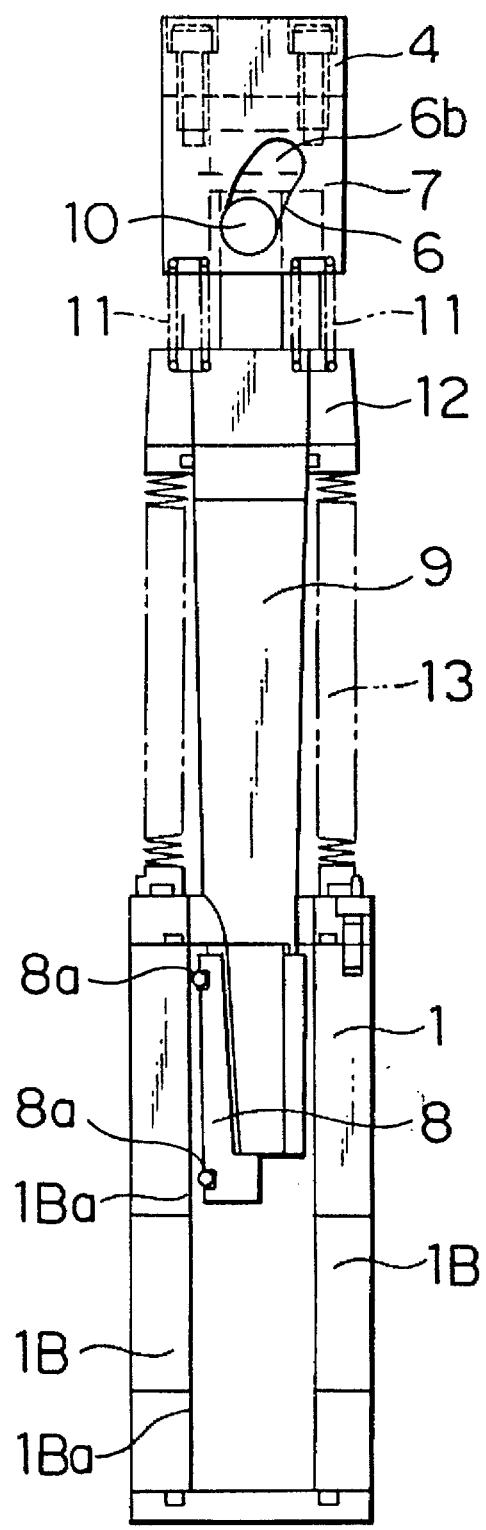
FIG. 2 is a cross sectional view of FIG. 1 taken along line A—A.
Figure 3:
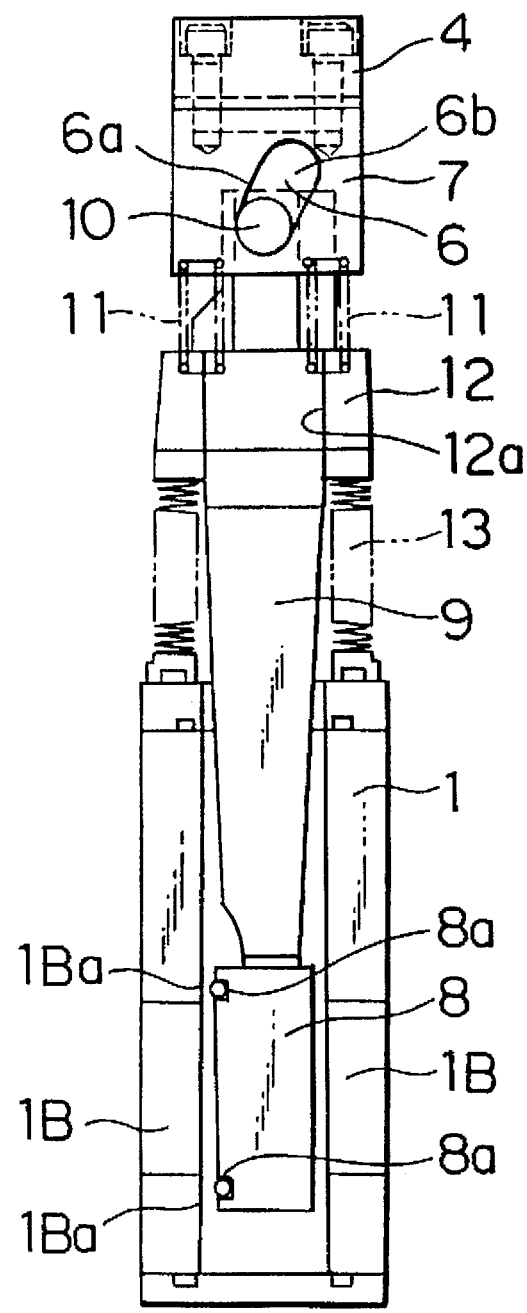
FIG. 3 is an operational structural view of the valve of FIG. 2 in a half-closed state.
Figure 4:
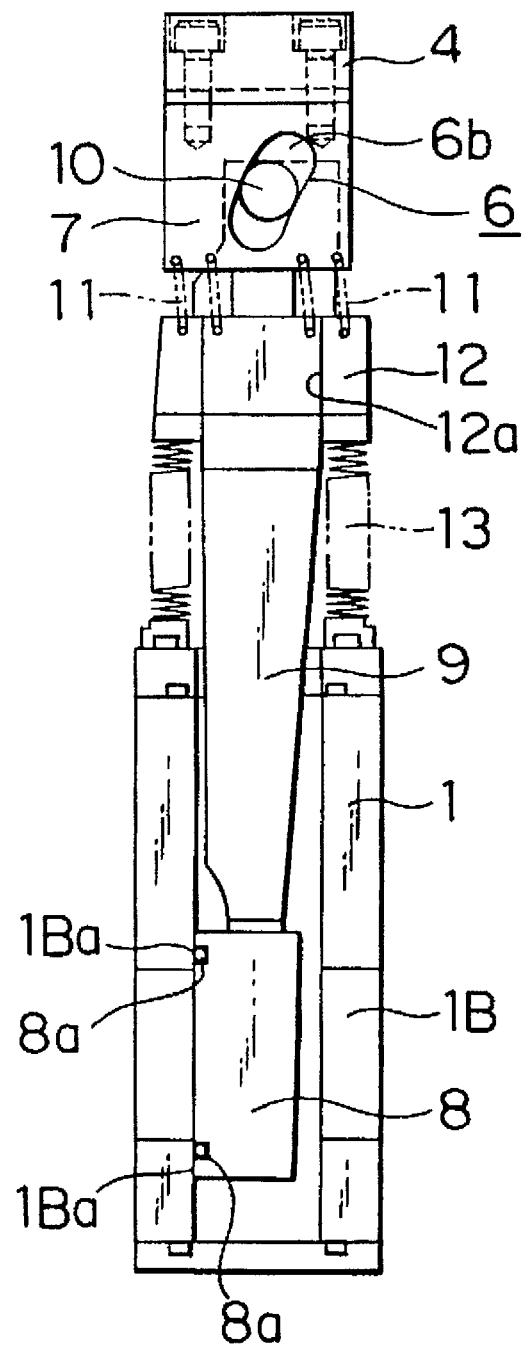
FIG. 4 is an operational structural view of the valve of FIG. 2 in a fully closed state.
Figure 5:
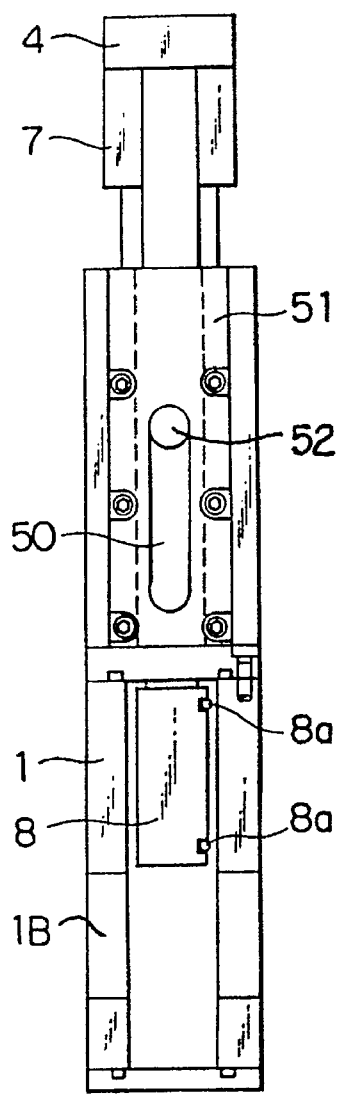
FIG. 5 is a cross sectional view of the valve of FIG. 1 in an open state.

As shown in FIGS. 2 through 4, the cam hole or slot 6 has a linear guide section 6a, and a lock section 6b, which is formed continuously with the linear guide section 6a, for locking the cam follower 10. The valve rod 9 is constructed so that it is locked when the cam follower 10 engages with the lock section 6b. As shown in FIG. 5, a guide roller 52, provided at the outer side of the slide body 12, engages in a guide hole 50, provided in at a guide body 51 at the inner side of each of the cylinders 2 and 3.

Next, the operation of the valve will be described.

When the valve is open, as illustrated in FIGS. 1, 2 and 5 operating each of the cylinders 2 and 3 causes the valve rod 9 and the valve body 8 to move downwards by means of each of the rods 2a and 3a, the connecting member 4, the cam body 7, and the slide body 12, as shown in FIGS. 2 and 3. At the same time, the seal bellows 13 contracts, as shown in FIG. 3, and the valve body 8 is in a lower position, laterally adjacent to, but not closing the opening 1B.

Under the above-described condition, when the cylinders 2 and 3 are further operated to move the cam body 7 downwards, the cam follower 10, at the end of the valve rod 9, moves along the linear guide section 6a of the cam body 7. As a result, the valve rod 9 is tilted, and, at the same time, the valve body 8 is also tilted as permitted by the compression and lateral movement of flexible members 11 due to the camming action, as shown in FIG. 4, to be brought completely together with the valve seat 1Ba surrounding at the opening 1B. As a result the opening 1B is closed.

Figure 6:
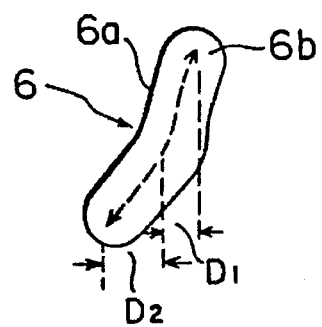
FIG. 6 is a structural view of a cam hole.

Further, operating the cylinders and linearly moving the cam body 7 causes the cam follower 10 to engage with the lock section 6b, which is a bent portion of the cam hole 6. The valve rod 9 remains in a tilted locking state. The opening is capable of being closed by tilting the valve rod 9 even after the driving of each of the cylinders 2 and 3 has been stopped. In addition, in opening the closed opening 1B, each of the cylinders 2 and 3 are operated in reverse mode, so that the connecting member 4, the cam body 7, and the slide body 12 each move linearly in the opposite direction. In the aforementioned operation, as shown in FIG. 6, when the valve body 8 functions to close the opening, 1B, O-rings 8a come into contact with the valve seat 1Ba by means of a first cam lead D1, and is closed by means of a second cam lead D2. When it functions to open the opening, adhesive forces of the O-rings 8a with respect to the valve seat 1Ba are resisted, with the second cam lead D2, so as to tear away the 8a therefrom.

The non-sliding vacuum gate valve of the present invention is so constructed as to provide the following advantages. Linear movement of the swing body, the cam body, and the slide body by the cylinders alone allows the valve rod to move in a linear and tilted manner by means of the cam follower which engages in the cam hole. Accordingly, the amount of particles is minimized, making it unnecessary to take special measures against dust, as it has been done conventionally, in using a super-clean room. This greatly reduces costs. In addition, since movement in a linear and tilted manner can be performed in one movement, opening and closing operations can be performed at a much higher speed as compared to conventional valves.

What is claimed is:

1. A non-sliding vacuum gate valve for performing opening and closing operations on an opening of a valve housing by a valve body which is connected to one end of a linearly and tiltably movable valve rod having an opposite end portion, based on the movement and tilting of said valve rod, by means of a seal bellows, one end of which is provided on said valve housing, said seal bellows having an opposite end, the valve so constructed as comprising: a plurality of cylinders having respective pistons and piston rods, each said piston rod having an end, a connecting member between and attached to said piston rod ends, said cylinders being provided on said valve housing; a cam body which has a cam hole and is provided on said connecting member; a cam follower which engages in said cam hole and is provided at said opposite end portion of said valve rod; and a slide body attached to said valve rod and to said opposite end of said seal bellows and connected to said cam body by means of a plurality of compression spring supporting members extending in the direction of said linear movement of said valve rod to permit linear and tilting movement between said valve rod and said cam body; wherein linear movement of said cam body causes linear and tilting movement of said valve rod and valve body.

2. A non-sliding vacuum gate valve according to claim 1, wherein a pair of guide bodies, each having a guide slot, are each provided respectively on an inner side of one of said cylinders, and a guide roller on said slide body is engaged in each said guide slot.

3. A non-sliding vacuum gate valve according to claim 2, wherein said cam hole has a linear guide section for linearly guiding said cam follower, and a lock section for locking said cam follower.

4. A non-sliding vacuum gate valve according to claim 1, wherein said cam hole has a linear guide section for linearly guiding said cam follower, and a lock section for locking said cam follower.

5. A non-sliding vacuum gate valve comprising a housing having a valve opening therethrough including a valve seat surrounding said opening, a valve bonnet on said housing having a valve rod opening therethrough adjacent to said valve seat, a valve rod having length extending and freely movable through said valve rod opening and having opposite ends, a valve body mounted on one of said ends of said valve rod within said housing, said length of said valve rod including a length portion projecting outwardly from said valve rod opening and including the other of said opposite ends of the valve rod, a flexible vacuum sealing bellows disposed around said valve rod and having opposite ends, one of said bellows ends being attached to said housing and surrounding said valve rod opening, and means mounting said valve rod for substantially linear and tilting movement whereby said valve body engages and disengages said valve seat with non-sliding movement to alternately close and open said valve opening, said valve rod mounting means comprising a slide body attached to said valve rod projecting length portion, the other of said opposite ends of said vacuum sealing bellows being attached to said slide body for movement therewith, means mounting said slide body for tilting and linear movement towards and away from said housing whereby said tilting movement of said slide body provides said tilting movement of said valve rod, a cam body mounted for linear reciprocal movement towards and away from said housing, and a cam on one of said cam body and said valve rod projecting length portion, said cam being angularly disposed with respect to said linear direction of movement of said slide body, a cam follower on the other of said cam body and said valve rod projecting length portion and engaging said cam whereby said valve rod moves in response to said movement of said cam body, compressible spring means extending between said cam body and said slide body and permitting tilting and linear movement of said slide body with respect to said cam body, and means for selectively and alternately imparting said reciprocal movement to said cam body whereby, when said cam body moves linearly towards said housing said valve rod and said valve body move linearly during a first portion of the movement and said valve rod tilts and moves said valve body into closing engagement with said valve seat during a subsequent portion of the movement, and when said cam body moves away from said housing said valve rod tilts during a first portion of the movement and moves said valve body out of said closing engagement with said valve seat to open said valve opening and said valve rod and said valve body move linearly during a subsequent portion of the movement.

6. A gate valve according to claim 5, wherein said cam is a cam slot in said cam body and said cam follower is a roller mounted on said valve rod projecting portion adjacent to said other of said opposite ends of said valve rod and in roller engagement with said cam slot, said cam slot having first and second sections, said second section comprising a lock section for releasably locking said roller therein when said valve body engages said valve seat.

7. A gate valve according to claim 5, wherein said valve rod mounting means further comprises a cylinder having a piston therein, said piston having a piston rod connected to said cam body, whereby movement of said piston imparts said linear movement to said cam body.

8. A gate valve according to claim 7, wherein said cylinder is attached to said valve housing, and which further comprises a guide body attached substantially to said cylinder, said guide body having a linear roller slot aligned in said direction towards and away from said housing, and said means mounting said slide body for tilting movement and for linear movement comprises a roller mounted on said slide body in roller engagement with said guide body roller slot, and a connecting member connecting said piston rod to said cam body.

9. A gate valve according to claim 5, wherein said valve rod projecting length portion extends through and projects outwardly at its said opposite end from said slide body, said cam is a cam hole in said cam body, and said cam follower comprises a cam roller mounted on said outwardly projecting opposite end of said valve rod and engaging said cam hole.

10. A gate valve according to claim 9, wherein said compressible spring means between said cam body and said slide body comprises a plurality of compressible springs in peripherally spaced relation with respect to said outwardly projecting valve rod length portion.

11. A non-sliding vacuum gate valve comprising a valve housing having a valve opening therethrough including a valve seat surrounding said valve opening, a valve bonnet on said housing having a valve rod opening therethrough adjacent to said valve seat, a valve rod having length extending and freely movable through said valve rod opening and having opposite ends, a valve body mounted on one of said ends of said valve rod within said housing, said length of said valve rod including a length portion projecting outwardly from said valve rod opening and including the other of said opposite ends of the valve rod, a flexible vacuum sealing bellows disposed around said valve rod and having opposite ends, one of said bellows ends being attached to said housing and surrounding said valve rod opening, and means mounting said valve rod for substantially linear and tilting movement whereby said valve body engages and disengages said valve seat with non-sliding movement to alternately close and open said valve opening, said valve rod mounting means comprising a slide body attached to said valve rod projecting length portion, the other of said opposite ends of said vacuum sealing bellows being attached to said slide body for movement therewith, means mounting said slide body for tilting and linear movement towards and away from said housing whereby said tilting movement of said slide body provides said tilting movement of said valve rod, a cam body mounted for linear reciprocal movement towards and away from said valve housing, and a cam on said cam body, said cam being angularly disposed with respect to said linear direction of movement of said slide body, a cam follower on said valve rod projecting length portion and engaging said cam whereby said valve rod moves in response to said movement of said cam body, compressible spring means extending in the direction of said linear reciprocal movement of said cam body and urging said cam body and said valve rod apart and permitting tilting and linear movement of said slide body with respect to said cam body, and means for selectively and alternately imparting said reciprocal movement to said cam body whereby, when said cam body moves linearly towards said housing said valve rod and said valve body move linearly during a first portion of the movement and said valve rod tilts and moves said valve body into closing engagement with said valve seat during a subsequent portion of the movement, and when said cam body moves away from said housing said valve rod tilts during a first portion of the movement and moves said valve body out of said closing engagement with said valve seat to open said valve opening and said valve rod and said valve body move linearly during a subsequent portion of the movement.

\* \* \* \* \*

UNITED STATES PATENT AND TRADEMARK OFFICE
CERTIFICATE OF CORRECTION

PATENT NO. : 5,626,324
DATED : May 6, 1997
INVENTOR(S) : Nakamura et al.

It is certified that error appears in the above-indentified patent and that said Letters Patent is hereby corrected as shown below:

Column 1, line 19, change "opening" to --openings--;
line 40, change "speed" to --speeds--.

Column 2, line 63, delete "a" between "underside" and "surface".

Column 3, line 1, delete "," (comma) after "12"; line 22, delete "at" (first occurrence); line 26, after "5" insert --,-- (comma); line 42, delete "at" after "surrounding"; line 48, after "opening", insert --1B--; line 61, before "8a" insert --O-rings--.

Column 4, line 37, change "2" to --1--; line 41, change "1" to --2--.

Signed and Sealed this

Twenty-third Day of December, 1997

Attest:

BRUCE LEHMAN

*Attesting Officer*     *Commissioner of Patents and Trademarks*